United States Patent [19]

Billard et al.

[11] Patent Number: 4,498,392
[45] Date of Patent: Feb. 12, 1985

[54] INFRARED DECOY LAUNCHING DEVICE TO BE DEPLOYED RAPIDLY WITH A DOUBLE SAFETY DEVICE

[75] Inventors: Alain A. Billard, Muret; Hubert C. Calmettes, Toulouse; Roland C. Encoyand, Muret, all of France

[73] Assignee: Etienne LaCroix - Tous Artifices, Muret, France

[21] Appl. No.: 384,098

[22] Filed: Jun. 1, 1982

[30] Foreign Application Priority Data

Jun. 3, 1981 [FR] France ................. 81 10976

[51] Int. Cl.³ .................. F42B 4/22; F42B 4/24; F41F 5/02
[52] U.S. Cl. ................. 102/342; 102/357
[58] Field of Search .......... 89/1.5 R, 1.5 C, 1.5 D; 102/223, 229, 247, 251, 254, 342, 345, 489, 357

[56] References Cited

U.S. PATENT DOCUMENTS

| | | | |
|---|---|---|---|
| 2,459,687 | 1/1949 | Decker | 102/345 |
| 2,476,117 | 7/1949 | Short | 102/393 |
| 3,511,457 | 5/1970 | Pogue | 89/1.5 R |
| 3,724,385 | 4/1973 | Beatty et al. | 102/247 |
| 3,841,219 | 10/1974 | Schillreff | 102/342 |
| 4,171,669 | 10/1979 | Allen | 102/342 |
| 4,266,462 | 5/1981 | Carter et al. | 89/1.5 D |

FOREIGN PATENT DOCUMENTS

| | | | |
|---|---|---|---|
| 0048204 | 3/1982 | European Pat. Off. | 102/342 |
| 2036520 | 12/1970 | France . | |
| 1534134 | 11/1978 | United Kingdom . | |

OTHER PUBLICATIONS

Revue Internationale De Defense, "Equipements de guerre électronique montés sur avions", 1976, p. 192.

Primary Examiner—Richard E. Schafer
Assistant Examiner—David K. Cornwell
Attorney, Agent, or Firm—McCormick, Paulding & Huber

[57] ABSTRACT

An infrared decoy member is provided with a pyrotechnic chain for ejection and ignition incorporated in a unit. The ejection charge is mounted to slide in a cavity which allows the ejection of the unit as well as of adjacent infrared charges. A slide, which can be released when an acceleration threshold is crossed and on condition of ejection could ensure the transmission of fire to a transverse channel leading to useful charges. A second fire-transmitting chain which is independent, makes it possible to excite previously a similar decoy member located below.

9 Claims, 6 Drawing Figures

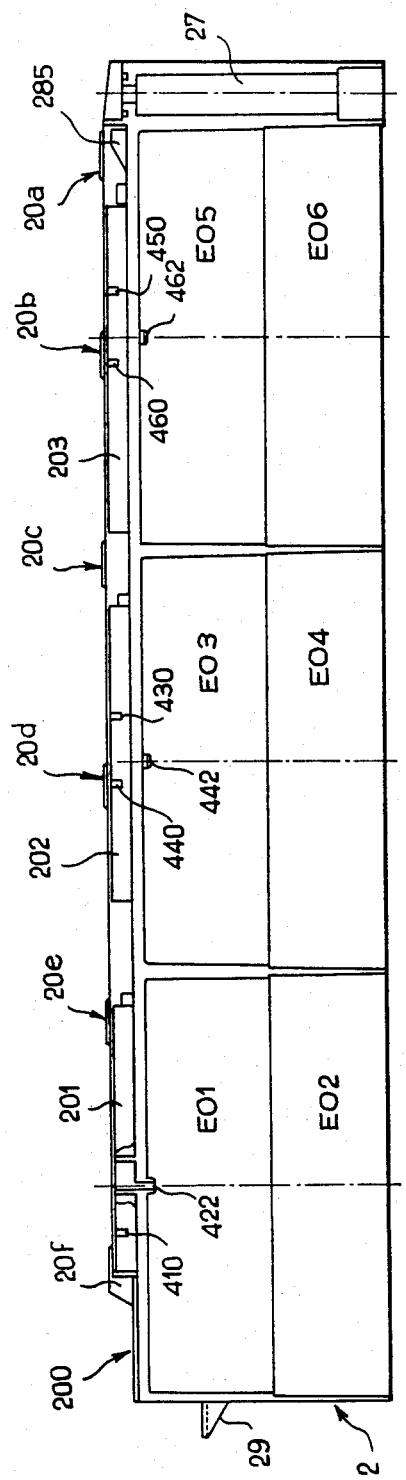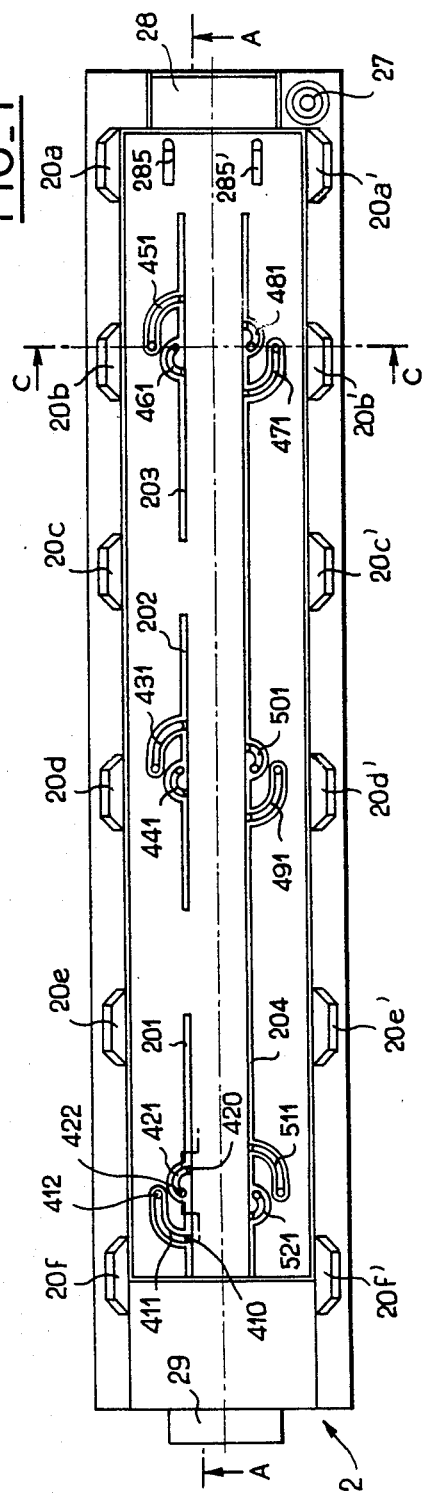

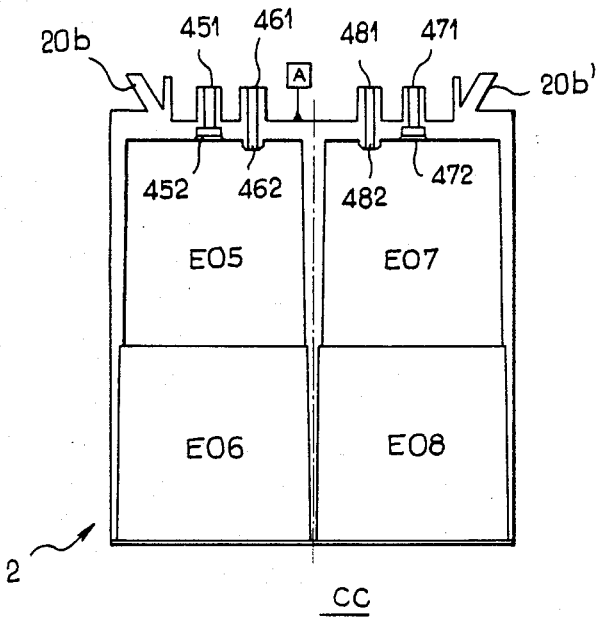
FIG_3
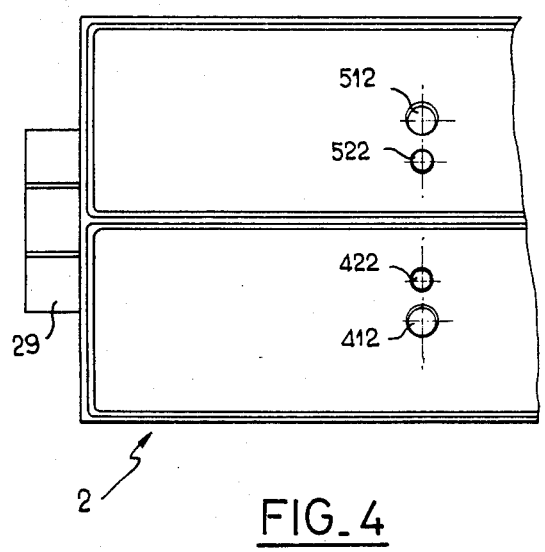
FIG_4

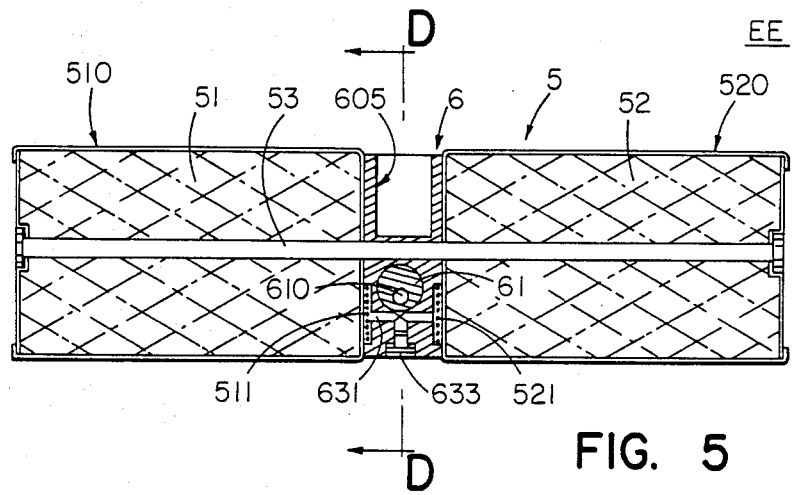
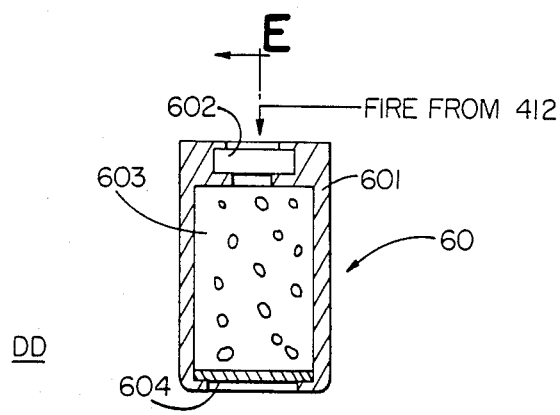
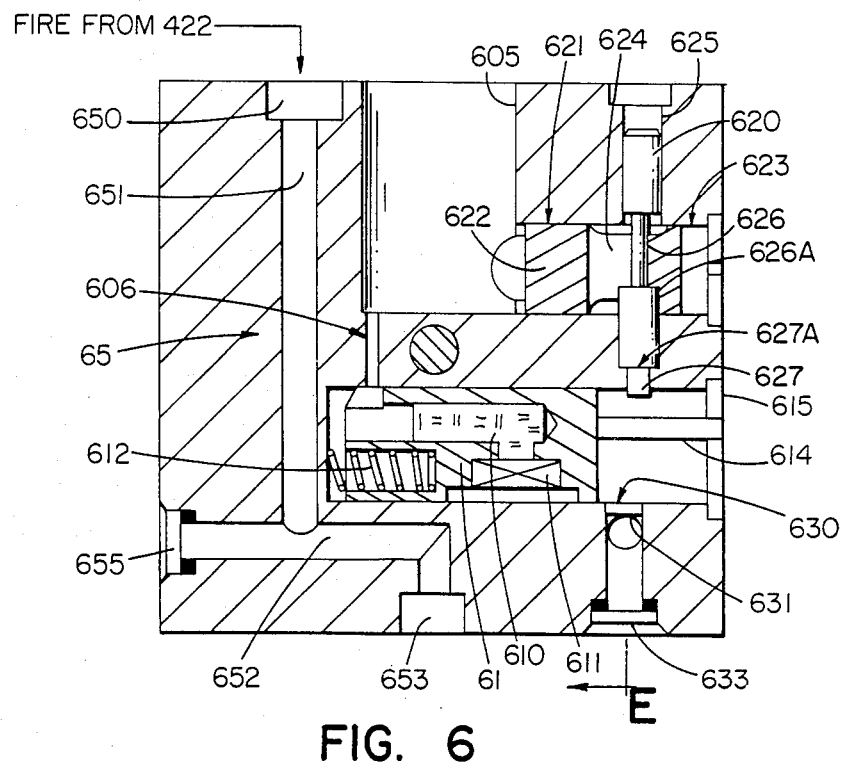
FIG. 5
FIG. 6

INFRARED DECOY LAUNCHING DEVICE TO BE DEPLOYED RAPIDLY WITH A DOUBLE SAFETY DEVICE

The present invention relates to countermeasures of the infrared decoy type, in particular for aircraft.

The main problem encountered with this type of countermeasure is to reconcile:
- the requirements of "seduction" of the attacking missile, even in the most unfavourable cases, which assume rapid deployment of intense infrared radiation very close to the aircraft, combined with a sufficiently slow relative movement of the decoy and aircraft and
- the requirement of safety, since the aircraft must not be endangered by the decoy which it uses to defend itself.

The present invention resolves this problem neatly, which makes it possible for the major dimension of the infrared decoy to be arranged transversely with respect to the direction of ejection which is itself substantially perpendicular to the axis of the aircraft, two decoys of this type—or more—being able to be superimposed in the ejection device. Improved safety devices allow rapid deployment, at a short distance, without danger for the aircraft to be protected.

The proposed infrared decoy launcher device is of the type comprising a launcher case having at least one major dimension, as well as at least one infrared decoy member which can be housed in this case and provided with a pyrotechnic chain for ejection and ignition. According to different aspects of the invention, the pyrotechnic chain ejects the decoys transversely with respect to their major dimension. It is contained in an actuating unit adjacent to at least one infrared decoy charge. This unit comprises a cavity in which an ejection charge container slides, which is intended to break a pressure safety device constituted by a disc in order to initiate a pyrotechnic delay arrangement and relay-exciter contained in a slide which is able to move under the effect of spring return means. The initial position—slide not aligned—is defined by a rod (first inhibitor) supported laterally on the launcher case. The final position—slide aligned—is defined by a stop such that the relay-exciter is located opposite a disc which can be perforated, provided in the unit upstream of a longitudinal fire-transmission channel for priming the infrared charges.

Moreover, the unit also contains a second inhibitor member normally locking the slide in the position for rupturing the chain, if the acceleration does not exceed a predetermined threshold. Depending on the acceleration, this inhibitor member comprises an inertia block, whereof the initial position is defined by a pin moved by the pressure of the gases coming from the ejection charge.

Moreover, a longitudinal rod forming a beam passes through the actuating unit and the infrared charges. This rod is connected to the unit by punching. The infrared charges are fixed to the arrangement by bolting to the rear rod of the cups.

In the preferred embodiment, the unit comprises a second fire-transmission chain, separated from the first and terminating vertically with respect to the cavity for the ejection charge, on the opposite side of the unit, which makes it possible to actuate previously a second infrared decoy member, similar to the first and located downstream of the latter in the launcher case.

Preferably, the second fire-transmission chain is provided in parallel with a member forming a calibrated valve, which bypasses this second chain when the first infrared decoy member has been ejected.

Preferably, the device according to the invention is inserted in a launcher module of the type defined in U.S. patent application No. 384,097 filed on June 1, 1982 entitled "Securing apparatus for modules carried on aircraft, in particular for flare launching modules".

In a similar case, the launcher case is an elongated parallelepipedal module, provided with male engagement members able to cooperate in the manner of dovetails with female engagement members of a support rod and the engagement members are separated from each other according to the same geometric progression along the main dimension of the module.

According to the invention, the launcher case comprises pairs of pyrotechnic channels, which can be initiated independently, are staggered on either side along the axis of the launcher case and arranged in each pair in order to cooperate respectively with the two fire-transmission chains of an associated actuating unit.

The pyrotechnic channels of the launcher case may thus cooperate with the respective electrical initiators.

Further features and advantages of the invention will become apparent on reading the ensuing detailed description, made with reference to the accompanying drawings, given in order to illustrate a preferred embodiment of the invention in a non-limiting manner and in which:

FIG. 1 is a sectional view of the launcher case used in the preferred embodiment of the present invention;

FIG. 2 is a top plan view of the same launcher case, where the section line A—A of FIG. 1 appears;

FIG. 3 is a sectional view on line C—C of FIG. 2;

FIG. 4 is a partial bottom plan view of the module of FIG. 2, as regards the left-hand part of this figure;

FIG. 5 is a sectional view of an infrared decoy member according to the present invention and FIG. 6 is a sectional view on section line D—D of FIG. 5, this FIG. 6 also showing the broken section line E—E along which said FIG. 5 is taken.

In FIGS. 1 to 4, the launcher case is designated by the general reference 2. This launcher case is advantageously a module of the type described in the aforementioned U.S. patent application, and it will thus be described only briefly.

The upper part 200 of the launcher case 2 defines a generally flat wall, provided on either side with male engagement members 20, able to cooperate in the manner of dovetails with female engagement members of a support rod (described in the aforementioned patent application). The engagement members are separated from each other according to the same geometric progression along the main dimension of the module and its upper side 200. These engagement members are designated by the references 20a to 20f in the upper part of FIG. 2 and by the same references bearing a ' in the lower part of this same figure. A handle 29 is shown in the left-hand part of the figures. The right-hand part shows the housing 27 for a rotary device which makes it possible to bring about translation of the module with respect to the support rod and to ensure locking in the manner indicated in the above mentioned patent application. The projections 285 and 285' allow the fixing of an electrical connecting device, whereof the connector element projects at 28, in order to fit on a counterpart connector of the support rod.

The interior of the module is sub-divided longitudinally into two parts. Six locations for infrared decoy members are defined above the section line A—A in the upper part of FIG. 2, which locations are marked EO1 to EO6 (FIG. 1). An equal number of decoys may be located in the lower part of FIG. 2 and the first two of the latter, namely EO7 and EO8, are shown in FIG. 3.

The top part 200 of the module 2 comprises ribs 201, 202, 203 and 204 on which primary pyrotechnic channels are supported, each having an inlet such as 410 (FIG. 1), a main part such as 411 (FIG. 2) and an outlet towards the inside of the module, such as 412 (FIG. 4). Generally, these channels will be referred to by their intermediate part, whereof the reference numeral terminates in 1. FIG. 2 shows that a first pair of channels 411 and 421 is supported on the rib 201. As will be seen hereafter, it will make it possible to excite the modules located at EO1 and EO2. A second pair of channels 431 and 441, supported on the rib 202, will make it possible to excite the decoys EO3 and EO4. Similarly, channels 451 and 461 relating to the decoys EO5 and EO6 are supported on the rib 203. The same thing is illustrated in the lower part of FIG. 2, except that the rib 204 is continuous, the references of the primary pyrotechnic channels also increasing by 10 units on each occasion. FIGS. 1 to 4 show that one of these primary channels, for example 410 to 412, leads to the inside of the module on a slightly recessed part, such as 452 and which is arranged symmetrically with respect to the module location such as EO5. On the other hand, the other primary pyrotechnic channel of the same pair, such as 461, terminates in a projection inside the module, in this case bearing the reference 462, this being arranged asymmetrically with respect to the location of the infrared decoy member EO5. The projections such as 462 and the recesses such as 452 are intended to provide sealed interlocking.

We shall now describe one of the decoy members located in one of the locations, this location being assumed to be EO1.

In FIG. 5, the decoy member 5 comprises two infrared decoy charges 51 and 52, located on either side of an actuating unit 6 and connected to the latter by a mechanical connection 53 terminated by bolt heads. The decoy charges are located in suitable envelope cups 510 and 520.

Located facing the outlet 412 of the primary pyrotechnic channel 411 is a cavity or barrel 605, which receives an ejection device or cartridge designated generally by the reference numeral 60. Arranged to slide in the cavity, the device 60 comprises a container 601 for an ejection charge 603, provided wth an intensifying primer 602. When burning, the ejection charge 603, which operates in the ejection direction, for example, downwardly in FIGS. 1, 3, 5, and 6 should firstly perforate a disc 604, before conferring the required thrust on the arrangement constituted by the remainder of the unit 6 and the two infrared charges 51 and 52. As a variation, the disc 604 is located in the unit 6.

It will be noted that the ejection of the arrangement is ensured by inverse ballistics, namely the container (unit 6 with the "barrel" 605) is ejected in place of the contents ("shell" 60). One thus ensures a considerable as well as brief thrust on the pyrotechnic charges, which contributes to satisfactory ejection: low ejection speed, with high but brief acceleration.

The first pyrotechnic chain (for example channel 411) continues by means of a channel 606 provided in the unit 6. After this a relay charge 610 with delay is provided, followed by a primer 611, this arrangement being contained in a slide 61, able to move transversely with respect to the unit 6, under the effect of spring return means 612. It will be noted that this movement takes place in the transverse direction which is directed not towards the charges 51 and 52, but towards the walls of the module 2.

If the slide 61 has moved towards the right into abutment with the wall 615 (under the conditions which will be seen hereafter), the primer 611 is positioned opposite a disc 630. After piercing of the disc, fire is transmitted through the channel 631 to the two infrared charges 51 and 52, respectively provided with ignition charges 511 and 521.

The arrival of the slide 61 in the fire-transmitting position is subject to several conditions.

First of all, a rod 614, opposing the action of the spring return means 612, extends from the slide 61 through an opening provided in the wall 615 into abutment with one wall of the launcher case. Thus, the slide can only be released after the decoy member has left the launcher case.

In the second place, the barrel 605 is connected to an open transverse bore 623, where a piston 622 provided with an O-ring 621 slides under friction. The piston will move towards the right (FIG. 6) solely in the presence of an adequate gas pressure after firing of the charge 603 (one will recall that the ballistics are inverse).

In a radial through-hole 624 the piston 622 receives an inertia block 620, which is in turn mounted to slide in a bore 625, parallel to the direction of ejection. The inertia block 620 is provided in its central part with a narrow section 626 between upper and lower shoulders, and below the lower shoulder a head 627. At the time of construction, the lower shoulder end 627A located just above the head 627 abuts against a corresponding shape of the bore 625 provided in the unit 6. In the opposite direction, the shoulder 626A is immobilized by an abutment of the radial through-hole 624 in the piston 622. The inertia block 620 is thus locked and the slide 61 cannot come into the fire-transmitting position, since the head 627 projects into the bore of this slide 61.

If the pressure of the gases developed by the charge 603 is sufficient (disc 604 punctured), the piston 621 moves in abutment towards the right. Its radial through-hole 624 thus provides an adequate cross-section for the passage of the inertia block 620.

Now if the decoy member acquires sufficient acceleration, the inertia block rises, thus releasing the slide 61. This device operates in a satisfactory manner even if the acceleration is short.

The conditions for using the infrared decoy are thus:
adequate ejection pressure,
adequate initial acceleration,
effective ejection of the decoy.

The arrangements according to the invention which have been described make it possible both to obtain excellent deployment of the infrared decoy, at the same time as great safety for the aircraft which deploys it.

As has been seen previously, the preferred embodiment of the invention uses two infrared decoy members mounted in a superimposed manner in the launcher module 2.

The unit 6 comprises a second pyrotechnic channel, which starts as a cavity 650, for example able to receive the projection 422 of the location of the decoy member EO1 in FIG. 1. The fire will thus be transmitted through a channel 651, then a bend 652 and a channel outlet 653, the latter terminating on the opposite side of the unit, vertically with respect to the cavity 605 for the ejection charge. It can be seen immediately that the fire may thus be transmitted to a unit similar to the unit 6 and located just below the latter. Naturally, this lower decoy member should be actuated previously, which will take place under the same conditions as previously.

The plug 655 will have been noticed, which closes off the orifice allowing piercing of the channel 652.

In turn, the lower decoy member, located for example in the location EO2 of FIG. 1, could be equipped exactly in the same manner as that of FIGS. 5 and 6, with a geometry corresponding to that which has been illustrated in FIG. 1. A simple manner of doing this consists of taking common units 6 and giving the infrared charges (51 or 52) a rectangular section close to that of a square, so that, when fixed in one direction, they enter the upper location and when fixed in the perpendicular direction they pass into the lower location.

Since the same infrared "cakes" are used in all the decoys, excellent reproduceability is obtained.

Naturally, if desired, the actuating unit for the lower decoy members could be simplified, or modified slightly, since it does not require the provision of a second pyrotechnic transmission chain.

If we now return to FIGS. 1 to 4, it can be seen that the latter make it possible to eject up to twelve infrared decoy members in sequence, in a precisely controlled manner and with little danger for the aircraft.

The latter can be initiated independently by the pairs of pyrotechnic channels illustrated in FIG. 2. These pyrotechnic channels are in turn initiated by electrical initiators, which are located in the central passage of the upper part 202 (FIG. 2) and may be controlled by individual connections coming from the connector located at 28 and not shown. The initiators are enclosed below a cover, provided with a flat joint. Initiators of this type are described in U.S. patent application No. 383,774 filed June 1, 1982 entitled "Improvements in or relating to a missile launcher module in particular for aircraft, with general reversible safety device", whereof the descriptive contents are to be incorporated in the present documents. In particular, the safety bar used in this other patent application is advantageously added to the arrangements according to the present invention.

Naturally, the present invention is not limited to the embodiment described and extends to all other variations within its scope.

We claim:

1. An infrared decoy launching device, comprising a launcher case as well as at least one infrared decoy member able to be housed in this case and provided with a pyrotechnic chain for the ejection of the decoy in a given direction from the case and ignition characterized by the fact that the decoy member has a major dimension which extends transversely to the direction of ejection in the launcher case and that the pyrotechnic chain is provided in order to bring about an ejection of the decoy member transversely with respect to its major dimension at a low speed, the pyrotechnic chain including ejection means having a barrel defined in the decoy member in axial alignment with the ejection direction and an ejection cartridge containing an ejection charge slidably received in this barrel to eject the decoy member in alignment with the ejection direction at a low speed with a high but short acceleration.

2. An infrared decoy launching device according to, claim 1 characterized by the fact that the ejection cartridge further includes a safety disc perforated when the pressure developed by the ejection charge is sufficient.

3. An infrared decoy launching device according to claim 1, characterized by the fact that the pyrotechnic chain between the ejection cartridge and the decoy member includes a relay charge with a delay mounted in a spring biased slide movable between a non-enabling initial position and a final, enabling position defined by an abutment, where the relay charge cooperates with the infrared charges and an inertia block inhibiting movement of the slide between the initial and final positions in advance of acceleration of the decoy member in the ejection direction.

4. An infrared decoy launching device according to claim 1 characterized by the fact that at least one inhibitor member sensitive to the pressure developed by the ejection charge is provided in the pyrotechnic chain.

5. An infrared decoy launching device according to claim 3, characterized by the fact that a rupturable disc is provided at the end of the pyrotechnic chain, which disc ruptures if the pressure developed by the ejection charge is sufficient, and a piston inhibitor, under the same pressure conditions releases the inertia block.

6. An infrared decoy launching device according to claim 1 in which said pyrotechnic chain is a fast pyrotechnic chain, and further characterized by a second pyrotechnic chain, separate from the first and terminating at a second infrared decoy member, similar to the first and located serially downstream of the first in the ejection direction.

7. An infrared decoy launching device according to claim 1 characterized by the fact that the launcher case is an elongated parallelepipedal module, provided with male engagement members able to cooperate in the manner of dovetails with female engagement members of a support rod and that the engagement members are separated from each other according to the same geometric progression along the main dimension of the module.

8. An infrared decoy launching device according to claim 8, characterized by the fact that the launcher case comprises pairs of pyrotechnic channels which can be initiated independently, are mounted between the engagement members, each pair of channels being located to cooperate respectively with the two pyrotechnic chains.

9. An infrared decoy launching device according to claim 8, characterized by the fact that the pyrotechnic channels of the launcher case cooperate with respective electrical initiators.

* * * * *